United States Patent
Morimoto et al.

(10) Patent No.: US 8,298,702 B2
(45) Date of Patent: Oct. 30, 2012

(54) SPIRAL ELECTRODE RECTANGULAR BATTERY

(75) Inventors: Takuya Morimoto, Itano-Gun (JP); Ryuji Ohshita, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 1000 days.

(21) Appl. No.: 11/390,075

(22) Filed: Mar. 28, 2006

(65) Prior Publication Data
US 2006/0222937 A1  Oct. 5, 2006

(30) Foreign Application Priority Data
Mar. 29, 2005 (JP) ................. 2005-095583

(51) Int. Cl.
H01M 2/00 (2006.01)
H01M 2/02 (2006.01)
H01M 4/00 (2006.01)
H01M 4/02 (2006.01)
H01M 4/13 (2010.01)
H01M 4/64 (2006.01)
H01M 4/72 (2006.01)
H01M 6/08 (2006.01)
H01M 6/10 (2006.01)
H01M 6/12 (2006.01)
H01M 6/46 (2006.01)

(52) U.S. Cl. .......... 429/174; 429/94; 429/162; 429/163; 429/164; 429/169; 429/211; 429/233

(58) Field of Classification Search .............. 429/94, 429/162–164, 169, 174, 211, 233
See application file for complete search history.

(56) References Cited

U.S. PATENT DOCUMENTS

| 5,344,724 | A | * | 9/1994 | Ozaki et al. ............. 429/94 |
| 5,439,760 | A | * | 8/1995 | Howard et al. .......... 429/94 |
| 5,458,993 | A | * | 10/1995 | Terao et al. ............. 429/94 |
| 5,834,133 | A |   | 11/1998 | Narukawa et al. |

(Continued)

FOREIGN PATENT DOCUMENTS
JP          58026462  A  *  2/1983

(Continued)

OTHER PUBLICATIONS

Inoue et al., English language abstract of JP 58026462 A, Feb. 1983.*

*Primary Examiner* — Basia Ridley
*Assistant Examiner* — Sean P Cullen
(74) *Attorney, Agent, or Firm* — Wenderoth, Lind & Ponack, LLP (57) ABSTRACT

A spiral electrode rectangular battery has a first electrode plate and second electrode plate, which are the positive and negative electrodes, laminated together with a separator sandwiched in between, rolled into an electrode unit, and housed in an exterior casing. The electrode unit has flat surfaces on opposite sides, and edges on both sides of those flat surfaces are curved with a prescribed radius of curvature to form rounded edge regions. The first and second electrode plates are wound around flat surfaces and rounded edge regions in a continuous fashion, and the end of the outer-most electrode plate is disposed at a rounded edge region. In addition, corner cuts are provided to truncate corner regions formed between the edges at both sides and the end of the outer-most electrode plate.

18 Claims, 4 Drawing Sheets

U.S. PATENT DOCUMENTS

| | | | |
|---|---|---|---|
| 6,432,578 B1 * | 8/2002 | Sugita et al. | 429/211 |
| 6,641,956 B1 * | 11/2003 | Suzuki et al. | 429/236 |
| 2001/0003863 A1 * | 6/2001 | Thibault et al. | 29/623.1 |
| 2003/0180605 A1 * | 9/2003 | Mizutani | 429/94 |
| 2004/0062982 A1 * | 4/2004 | Takezawa et al. | 429/130 |
| 2004/0234848 A1 * | 11/2004 | Chung et al. | 429/181 |
| 2005/0031950 A1 * | 2/2005 | Maeda | 429/164 |
| 2006/0003221 A1 * | 1/2006 | Yeo | 429/94 |

FOREIGN PATENT DOCUMENTS

| | | |
|---|---|---|
| JP | 9-171809 | 6/1997 |
| JP | 10-270014 | 10/1998 |
| JP | 2001-266946 | 9/2001 |
| JP | 2002-289257 | 10/2002 |
| JP | 2003-86233 | 3/2003 |

* cited by examiner

SPIRAL ELECTRODE RECTANGULAR BATTERY

BACKGROUND OF THE INVENTION

1. Field of the Invention

The present invention relates to a rectangular battery having a spiral type electrode unit housed in a rectangular exterior casing.

2. Description of the Related Art

The electrode unit of a rectangular battery laminates a separator between a positive electrode and a negative electrode. There are different types of layered structures of positive and negative electrodes. There is a sandwich configuration where positive and negative electrodes are cut in square shapes and stacked with the separator between them. There is also a spiral type electrode where long narrow strips of positive and negative electrode are rolled into a spiral shape with the separator between them and then pressed from both sides to flatten the sides (refer to Japanese Patent Laid-Open Publication 2001-266946 and Japanese Patent Laid-Open Publication HEI 9-171809 (1997)).

The spiral electrode rectangular battery cited in these and other disclosures has the characteristic that it can be efficiently manufactured in quantity while thin positive and negative electrodes can be rolled many turns to reduce the battery's internal electrical resistance. Consequently, this type of rectangular battery is preferably used in lithium ion rechargeable batteries, which have thin electrode plates. Since an electrode unit of this configuration is made by pressing both sides of the unit after rolling it into a spiral shape, it is preferable to position the end of the outer-most electrode plate winding at a rounded edge region rather than on a flattened surface. An electrode unit with the electrode end located at a rounded edge region allows both sides to be pressed into ideally flattened surfaces, Otherwise if the outer-most electrode plate end is located on a flattened surface, the surface will be pressed with a step formed along the boundary at the end of the outer-most electrode plate.

Further, as cited in Japanese Patent Laid-Open Publication H09-171809, a cut-out is provided on the flattened surface of the outer-most electrode plate, and this cut-out electrode region is folded-back for use as a collector terminal. Accordingly, in this type of electrode unit with the end of the outer-most electrode located at a rounded edge region, the collector terminal can be made sufficiently wide. A wide collector terminal has the characteristic that its internal electrical resistance is low and it can be reliably connected to the exterior casing.

However, a rectangular battery that positions the end of the outer-most electrode plate at a rounded edge region has the drawback that the end of the outer-most electrode plate becomes prone to breaking through the separator and causing an internal short circuit. In particular, if the end of the outer-most electrode plate is rolled off-center with a very slight shift up or down, a sharp edged corner between the sides and end of the outer-most electrode plate can tear through the separator, or particles and dust can ingress between the positive and negative electrodes in a corner region, and pierce through the separator to make internal short circuits likely. In addition to this drawback, if the rectangular battery is dropped and a corner of the exterior casing is impacted, the exterior casing can induce mechanical shock at a corner of the electrode unit. This also has the detrimental result that a corner region of the outer-most electrode plate becomes prone to breaking through the separator to cause an internal short circuit.

The present invention was developed with the object of further resolving the drawbacks described above. Thus it is a primary object of the present invention to provide a spiral electrode rectangular battery that, in addition to allowing ideal flat surfaces on both sides of the electrode unit, can effectively prevent internal short circuits at corner regions on the end of the outer-most electrode plate. The above and further objects and features of the invention will more fully be apparent from the following detailed description with accompanying drawings.

SUMMARY OF THE INVENTION

To realize the object described above, the spiral electrode rectangular battery of the present invention is provided with the following structure. The spiral electrode rectangular battery has an electrode unit 10 housed in an exterior casing 20. A first electrode plate 1 and a second electrode plate 2, one of which is the positive electrode and the other is the negative electrode, are layered with a separator 3 in between and rolled to form the electrode unit 10. Opposite sides of the electrode unit 10, which is rolled into a spiral shape, are formed as flat surfaces 11. Edge regions at both sides of the flat surfaces 11 are curved with a prescribed radius of curvature to form rounded edge regions 12. The first electrode plate 1 and the second electrode plate 2 form windings that connect flat surfaces 11 and rounded edge regions 12 in a continuous fashion, and the end of the outer-most electrode plate 6 is disposed at a rounded edge region 12. In addition, corner regions 8 between edges at both sides and the end of the outer-most electrode plate 6 are truncated by providing corner cuts 7.

A spiral electrode rectangular battery with this configuration has the characteristic that, in addition to allowing ideal flat surfaces on opposite sides of the electrode unit, it can effectively prevent internal short circuits caused by corner regions on the end of the outer-most electrode plate. This is because the end of the outer-most electrode plate winding of the spiral electrode unit is disposed at a rounded edge region, and because corner cuts are provided at the end of the outer-most electrode plate to truncate the corner regions between edges at both sides and the end of the outer-most electrode plate. Because this configuration of spiral electrode rectangular battery has its outer-most electrode plate end located at a rounded edge region and corner regions truncated by corner cuts, separator breakthrough at an outer-most electrode plate corner region, due to off-center electrode winding or mechanical shock from dropping, can be drastically reduced. Consequently, the spiral electrode rectangular battery of the present invention can effectively prevent internal short circuits caused by corner regions at the end of the outer-most electrode plate while positioning the end of the outer-most electrode plate at a rounded edge region to establish ideal flat surfaces on opposite sides of the electrode unit.

The spiral electrode rectangular battery of the present invention can position the end of the outer-most electrode platecore 4 at a rounded edge region 12. The spiral electrode rectangular battery of the present invention can position the boundaries between corner cuts 7 and the sides of the outer-most electrode plate 6 on flat surfaces 11 of the electrode unit 10. The spiral electrode rectangular battery of the present invention can be a non-aqueous electrolytic rechargeable battery.

In the spiral electrode rectangular battery of the present invention, an insulating protective tape 14 can be attached at the rounded edge region 12 to the inside surface of the outer-most electrode plate 6. The rounded edge region 12 is opposite the rounded edge region 12 where the end of the outermost electrode plate 6 is positioned. Further, in the spiral electrode rectangular battery of the present invention, part of the outer-most electrode plate 6 is cut-out on a flat surface 11 to provide a folded-back tab 9, and this folded-back tab 9 can be connected to the exterior casing 20. Finally, in the spiral electrode rectangular battery of the present invention, the end of the outer-most electrode plate 6 can be covered by an insulating tape 13 attached at the rounded edge region 12 to prevent electrode unwinding.

DETAILED DESCRIPTION OF THE PREFERRED EMBODIMENTS

Figure 1:
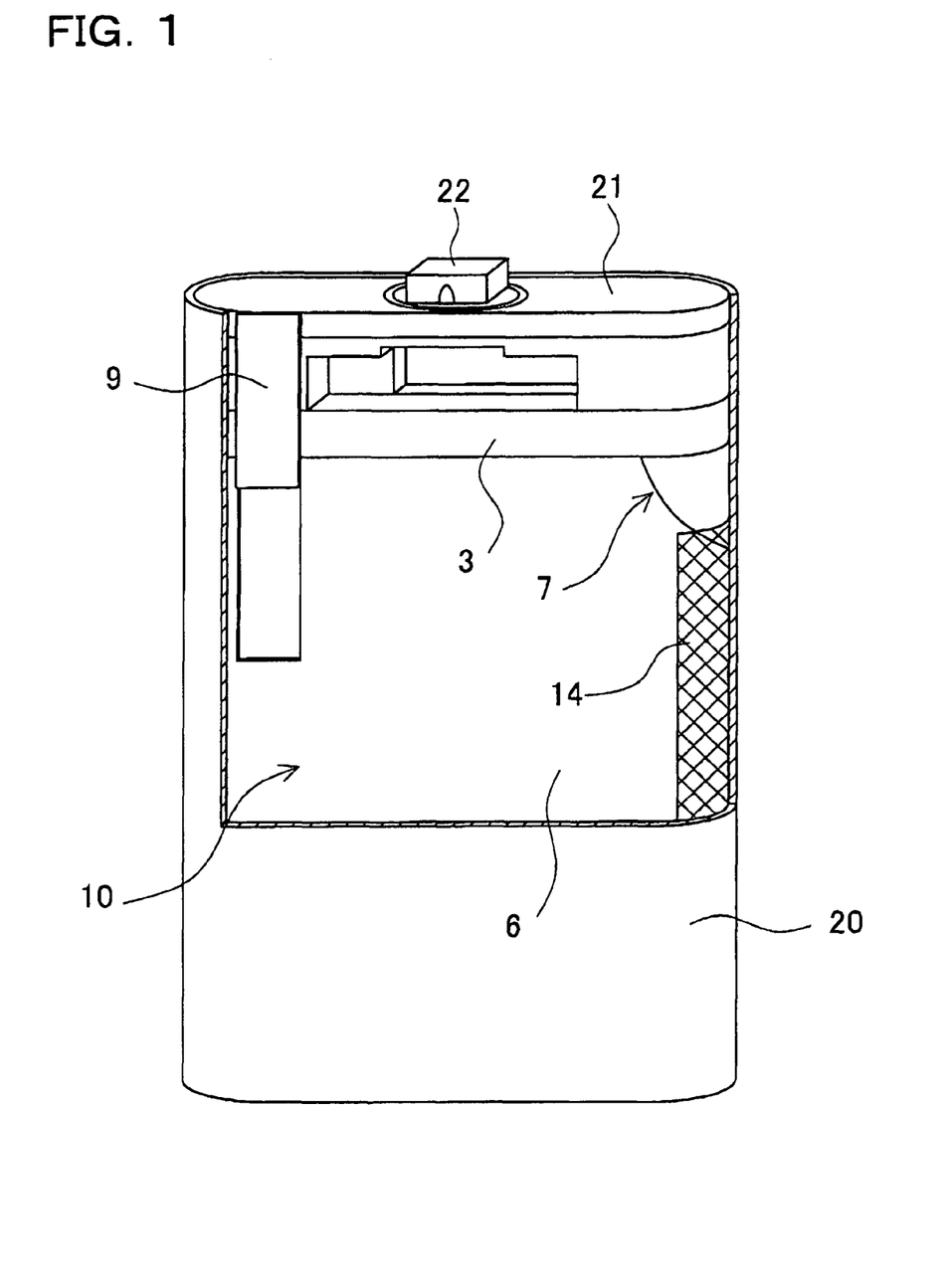
FIG. 1 is a perspective view partially in cross-section of an embodiment of the spiral electrode rectangular battery of the present invention.

The spiral electrode rectangular battery shown in FIG. 1 has an electrode unit 10 housed in an exterior casing 20. A first electrode plate 1 and second electrode plate 2, which are positive and negative electrodes, are layered with the separator 3 between them and rolled to form the electrode unit 10. As shown in the cross-section of FIG. 2, a non-aqueous electrolyte lithium ion rechargeable battery has active layers 5 coated on electrode cores 4, which are made from metal foil, to form the first electrode plate 1 and second electrode plate 2. To reduce internal electrical resistance, a metal foil such as aluminum foil or copper foil is used for the electrode cores 4. For example, a lithium ion rechargeable battery uses aluminum foil for the core 4 of the positive electrode and copper foil for the core 4 of the negative electrode. In this type of non-aqueous electrolyte rechargeable battery with metal foil electrode cores 4, it is possible for the electrode core 4 of the outer-most electrode plate 6 to pierce through the separator 3 and produce an internal short circuit. The rectangular battery of the present invention has a structure suitable for a non-aqueous electrolyte rechargeable battery because it can effectively prevent internal short circuits due to the outer-most electrode plate 6 piercing through the separator 3. However, the present invention can also effectively prevent internal short circuits in a battery that has an outer-most electrode plate with a metal foil electrode core, even though it is not necessarily a non-aqueous electrolyte rechargeable battery. Thus, the rectangular battery of the present invention is not limited to a non-aqueous electrolyte rechargeable battery.

Figure 2:
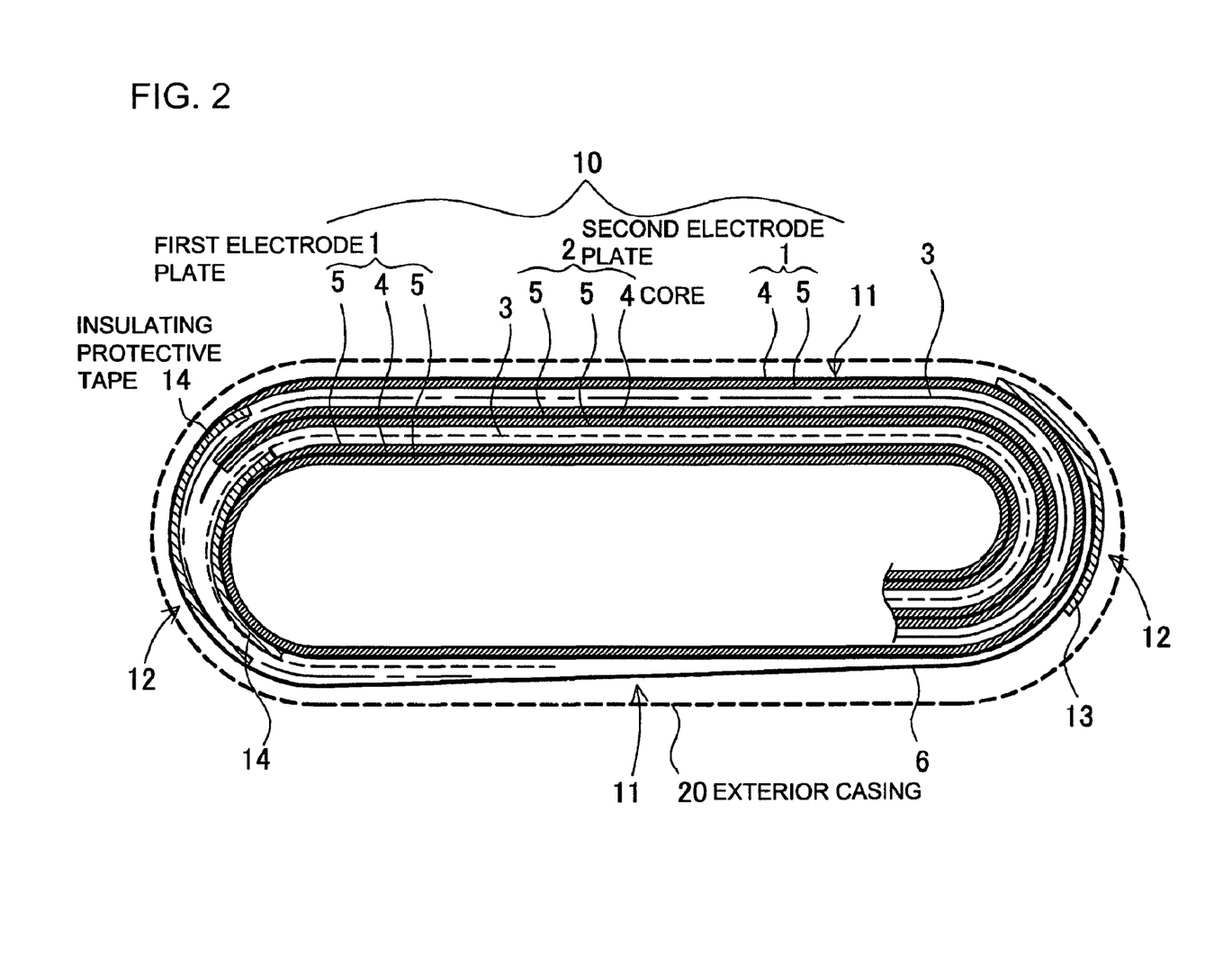
FIG. 2 is an enlarged horizontal cross-section view showing the electrode unit of the rectangular battery shown in FIG. 1.

In the first electrode plate 1 and second electrode plate 2, which are electrode cores 4 coated with active layers 5, active material paste is applied to electrode core 4 surfaces and dried to establish the active layers 5. Active layers 5 are not provided over the entire surfaces of both sides of the electrode cores 4. Active layers 5 are provided on the surfaces of the first electrode plate 1 and second electrode plate 2 that are opposite each other, and the active layers 5 of those opposing electrode plates are insulated by the separator 3.

The electrode unit 10, which is the first electrode plate 1 and second electrode plate 2 rolled into a spiral shape with the separator 3 layered in between, has opposite sides formed into flat surfaces 11. Edge regions at both sides of the flat surfaces 11 are curved with a prescribed radius of curvature to form rounded edge regions 12. In this electrode unit 10, the first and second electrode plates 1, 2 are wound into a spiral shape with the separator 3 layered in between. The electrode unit 10 is then further processed to form opposite sides into flat surfaces 11 by compressing the unit from both sides in a flat surface sandwiching press. The separator 3 is disposed between the first and second electrode plates 1, 2 and insulates the first electrode plate 1 from the second electrode plate 2. In the electrode unit 10, the width of the separator 3 is made wider than the width of the first and second electrode plates 1, 2. The separator 3 can reliably insulate the electrode unit 10 even with some shift in winding position of the first and second electrode plates 1, 2.

Figure 3:
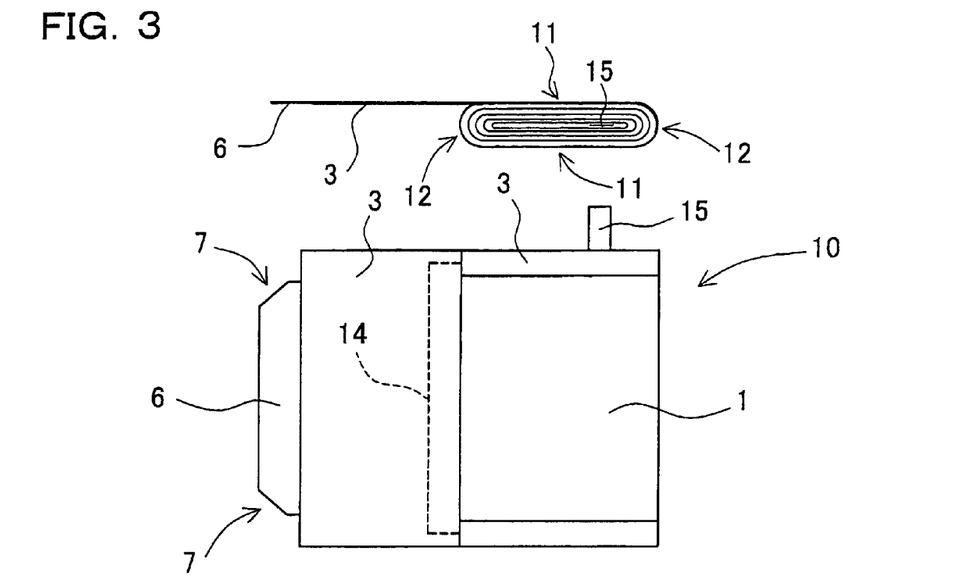
FIG. 3 is a plan view and front view of the electrode unit of the rectangular battery shown in FIG. 1 showing the unwound outer-most electrode plate.
Figure 4:
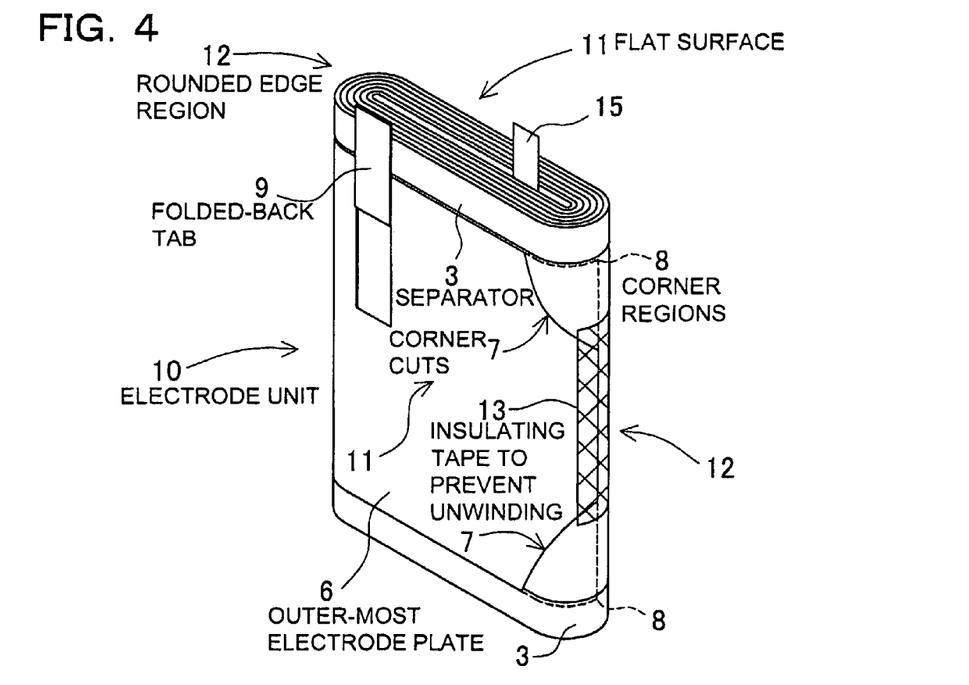
FIG. 4 is a perspective view of the electrode unit of the rectangular battery shown in FIG. 1.

As shown in FIGS. 2-4, the electrode unit 10, which is the spiral wound unit further processed by pressing both sides to a prescribed thickness, establishes a continuously wound structure with flat surfaces 11 and rounded edge regions 12. The pressing process compresses the wound spiral electrode unit 10 from both sides in a manner that positions the end of the outer-most electrode plate 6 at a rounded edge region 12. The purpose of this is to apply uniform pressure over entire surfaces during pressing, and press the unit to a prescribed thickness while retaining the first and second electrode plates 1, 2 as flat plates except at rounded edge regions 12. If the end of the outer-most electrode plate 6 is positioned on a flat surface 11, the first and second electrode plates 1, 2 will be pressed with a step formed along the boundary at the end of the outer-most electrode plate 6.

The electrode unit 10 of the figures has the first electrode plate 1 as the outer-most electrode plate 6. Although the first electrode plate 1, which is the outer-most electrode plate 6, is provided with active layers 5 on the surfaces of its core 4, no active layer 5 is provided on the end region, and the end of the electrode core 4 with no active layer 5 is positioned at a rounded edge region 12. Because the metal foil electrode core 4 is stiff, it is possible for its corner regions 8 to pierce through the separator 3. Therefore, it is particularly important to prevent corner regions 8 from piercing through the separator 3 to cause an internal short circuit in an electrode unit 10 that positions the end of an electrode core 4 at a rounded edge region 12.

Figure 5:
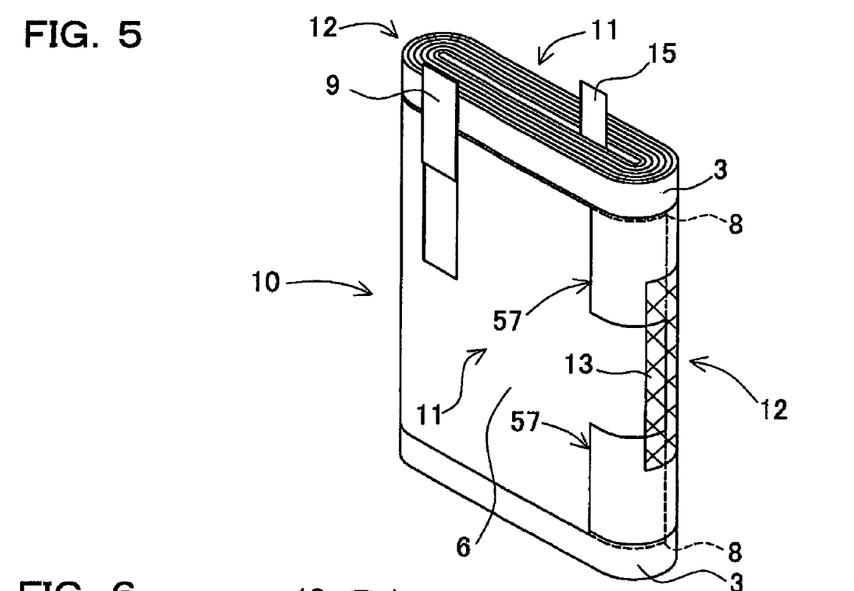
FIG. 5 is a perspective view of an electrode unit of another embodiment of the spiral electrode rectangular battery of the present invention.

To prevent corner regions 8 of the outer-most electrode plate 6 from piercing through the separator 3, corner cuts 7, 57, as shown in FIGS. 3-5, are provided to truncate corner regions 8 between edges at both sides and the end of the outer-most electrode plate 6, which is the first electrode plate 1. Corner cuts 7 are provided to truncate corner regions 8 of the outer-most electrode plate 6 core 4 in the electrode unit 10 shown in FIGS. 1 and 2. Corner cuts 7 at the corner regions 8 effectively prevent the electrode core 4 from piercing through the separator 3 and creating an internal short circuit. This is because the pointed corner regions 8 are eliminated from the rounded edge region 12.

In the electrode unit 10 of FIGS. 3-5, boundaries between edges at the sides of the outer-most electrode plate 6 and corner cuts 7, 57 are positioned on a flat surface of the electrode unit 10. This configuration has the characteristic that it can most effectively prevent a corner region 8 of the outer-most electrode plate 6 from piercing through the separator 3 to create an internal short circuit. This is because projecting regions at the boundaries between corner cuts 7, 57, which are made long and large, and edges at both sides of the outer-most electrode plate 6, can be moved from the rounded edge region 12, where internal short circuit is possible due to mechanical shock, to a flat surface 11.

Figure 6:
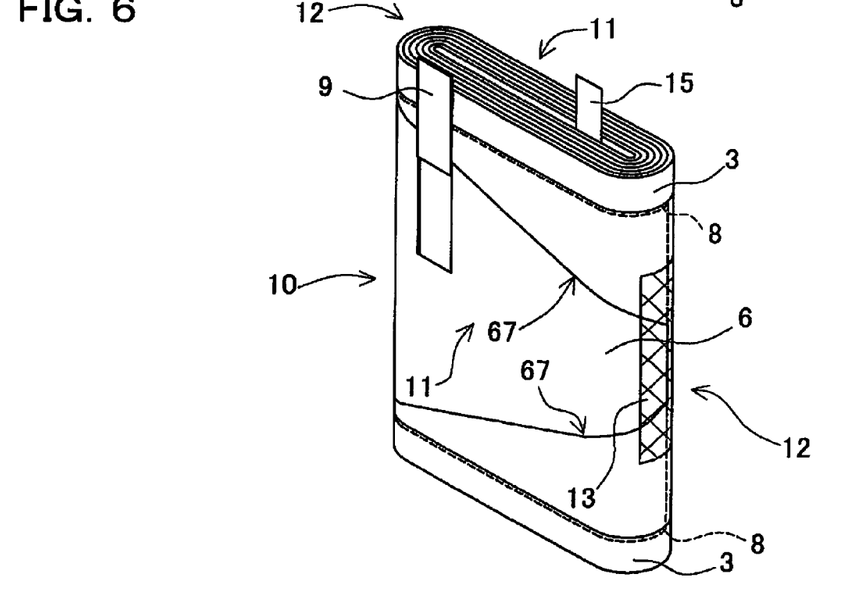
FIG. 6 is a perspective view of an electrode unit of further embodiment of the spiral electrode rectangular battery of the present invention.

The electrode unit 10 of FIGS. 3 and 4 is provided with corner cuts 7 that truncate corner regions 8 of the outer-most electrode plate 6 with straight line cuts. Corner cuts 7 of this shape can be easily provided by cutting off the corner regions 8 in a straight line with a blade. The electrode unit 10 of FIG. 5 is provided with L-shaped corner cuts 57 to truncate corner regions 8. Since, this configuration narrows the width of the outer-most electrode plate 6 that is located at the rounded edge region 12, it can effectively prevent internal short circuit from the outer-most electrode plate 6 at the rounded edge region 12. The electrode unit 10 of FIG. 6 is provided with curved corner cuts 67 to truncate corner regions 8. This configuration has the characteristic that sharp projecting regions are eliminated from the corner regions 8, and separator 3 break-through by pointed regions can be effectively prevented. As indicated above, the present invention does not specify the shape of corner cuts 7, 57, 67 provided to truncate corner regions 8 of the outer-most electrode plate 6, and cuts of any shape that remove parts of the corner regions 8 and allows internal short circuits to be prevented are possible.

The electrode unit 10 of the figures has part of the core 4 cut out of the outer-most electrode plate 6 located on the flat surface 11 to provide a folded-back tab 9. The folded-back tab 9 of electrode core 4 is used as a lead to connect the outer-most electrode plate 6 to the exterior casing 20. This electrode unit 10 can electrically connect the outer-most electrode plate 6 to the exterior casing 20 in a stable, low resistance configuration via the folded-back tab 9 of electrode core 4. The flat surface 11 of outer-most electrode plate 6, where the folded-back tab 9 is established, is electrode core 4 with no active layer 5. Consequently, no active layer 5 intervenes and the electrode core 4 of the folded-back tab 9 can be directly connected to the exterior casing 20 in a low resistance fashion. In an electrode unit 10 with a folded-back tab 9, the folded-back tab 9 is bent back 180° to allow its use as a lead after the spiral wound electrode unit 10 is pressed to a prescribed thickness. When the spiral electrode unit 10 is press-formed, the electrode core 4 folded-back tab 9 is within the flat surface 11. In this electrode unit 10, the flat surface 11 of the outer-most electrode plate 6 with the folded-back tab 9 can be pressed with uniform pressure to flatten the surface. As shown in FIG. 1, the folded-back tab 9 is sandwiched between, and welded to the exterior casing 20 and sealing plate 21.

In the electrode unit 10 of FIG. 2, the end of the outer-most electrode plate 6 is covered by an insulating tape 13 attached at the rounded edge region 12 to prevent electrode unwinding. The insulating tape 13 to prevent unwinding is plastic film provided with an adhesive layer that is within the width of the rounded edge region 12. The insulating tape 13 is attached to the surface of the electrode unit 10 along the rounded edge region 12 on one side, and holds the end of the outer-most electrode plate 6 to the electrode unit 10. In addition, this insulating tape 13 to prevent unwinding is disposed between the outer-most electrode plate 6 and the exterior casing 20, and serves as a cushioning layer for mechanical shock at the exterior casing 20. Accordingly, mechanical shock acting on the rounded edge region 12 of the electrode unit 10 from the exterior casing 20 can be absorbed by the insulating tape 13, and the insulating tape 13 can prevent damage to the electrode unit 10 due to mechanical shock.

Further, the electrode unit 10 shown in the cross-section view of FIG. 2 has an insulating protective tape 14 attached at the rounded edge region 12 on the left-side of the figure, which is opposite the rounded edge region 12 where the end of the outer-most electrode plate 6 is located. In the electrode unit 10 of FIG. 2, the insulating protective tape 14 is attached at the left-side rounded edge region 12 to the inside surface of the outer-most electrode plate 6, which is the first electrode plate 1. In addition, the electrode unit 10 of FIG. 2 also has the insulating protective tape 14 attached at the left-side rounded edge region 12 to the outside surface of first electrode plate 1 that is one winding inside the outer-most electrode plate 6. These insulating protective tapes 14 are also within the width of the rounded edge region 12. The insulating protective tapes 14 are formed of plastic film provided with an adhesive layer on its inside surface, and the inside tape is attached to the surface of the first electrode plate 1. Both of these insulating protective tapes 14 are positioned to cover the ridge at the end of the second electrode plate 2 that is layered opposite the first electrode plate 1 of the outer-most electrode plate 6. Because this electrode unit 10 has the insulating protective tape 14 between the end of the second electrode plate 2 and the first electrode plate 1, it can effectively prevent internal short circuits due to the second electrode plate 2 piercing through the separator 3 and contacting the first electrode plate 1 at the left-side rounded edge region 12. In this electrode unit 10, the insulating protective tape 14 is attached to the inside surface of the outer-most first electrode plate 1 and to the outside surface of the first electrode plate 1 that is one winding inside the outer-most electrode plate 6. With this insulating protective tape 14 pre-attached, the first electrode plate 1 is stacked with the separator 3 and the second electrode plate 2, rolled into a spiral shape, and press-formed. However, the insulating protective tape can also be attached to the surface of the second electrode plate 2.

In the rectangular battery of the figures, the first electrode plate 1, which is the outer-most electrode plate 6, is connected to the exterior casing 20 via the folded-back tab 9. The second electrode plate 2 has a lead 15 connected to its core 4 at a position which is separated from the folded-back tab 9. This lead 15 is connected to a projecting terminal 22 on the sealing plate 21. The sealing plate 21 is insulated from the rest of the rectangular battery and is provided with a projecting terminal 22, The negative and positive terminals of this rectangular battery are established by the projecting terminal 22 and the exterior casing 20. For the case of a lithium ion rechargeable battery, the positive terminal is established by the exterior casing 20 connected to the first electrode plate 1 via the folded-back tab 9, and the negative terminal is established by the sealing plate 21 projecting terminal 22 connected to the second electrode plate 2 via the lead 15. However, the rectangular battery of the present invention can also establish the exterior casing as the negative terminal and the projecting terminal as the positive terminal.

A spiral electrode rectangular battery, which is a lithium ion rechargeable battery, is fabricated as follows.

[Positive Electrode Slurry Preparation]

As a positive electrode active material, a positive electrode mixture is prepared by mixing $LiCoO_2$ powder with an average particle diameter of 5 μm, and synthetic graphite powder as the positive electrode conducting substance in a 9:1 ratio by mass. This positive electrode mixture and an adhesive solution of polyvinylidene fluoride dissolved as a 5 mass % solution in N-methyl-2-pyrrolidone (NMP) are mixed in a 95:5 ratio of solids by mass to prepare the slurry for positive electrode fabrication.

[Positive Electrode Fabrication]

The positive electrode slurry is applied to the positive electrode plate 1 core 4, which is aluminum foil (foil thickness: 15 μm), using a medical blade. The application mass per surface area after drying is 500 g/m² for application to both sides (250 g/m² for application to one side, omitting the collector). After slurry application, the electrode plate is dried and compressed to produce a positive electrode plate with an active material packed density of 3.7 g/cc. Finally, the electrode plate is cut to adjust it to battery width producing positive electrode plate for use in a battery as the first electrode plate 1.

Since this positive electrode plate, which is the first electrode plate 1, is also the outer-most electrode plate 6, corner cuts 7, 57, 67 are provided as shown in FIGS. 4-6 to truncate corner regions 8 from the outer-most aluminum foil region of the electrode plate. With respect to the corner regions 8 of the outer-most electrode plate 6, a rectangular battery with an electrode unit 10 provided with the corner cuts 7 of FIG. 4 is the first embodiment, a rectangular battery with an electrode unit 10 provided with the corner cuts 57 of FIG. 5 is the second embodiment, and a rectangular battery with an electrode unit 10 provided with the corner cuts 67 of FIG. 6 is the third embodiment.

[Negative Electrode Fabrication]

Scale structured natural graphite ($d_{002}$ value: 0.3356 nm, Lc value: 100 nm, average particle size: 20 μm) and a styrene-butadiene rubber (SBR) dispersion (48% solids) are co-dispersed in water, and the viscosity increasing agent carboxymethyl cellulose (CMC) is added to prepare the negative electrode slurry. Here, the slurry is prepared for the post-drying negative electrode to have a composition ratio of solids by mass of graphite: SBR: CMC=95:3:2. The slurry is applied to both sides of the negative electrode core 4, which is copper foil (foil thickness: 10 μm) to have a mass per surface area after drying of 200 g/m² (100 g/m² for application to one side, omitting the collector). Subsequently, the electrode plate is dried and compressed to produce a negative electrode plate with an active material packed density of 1.7 g/cc as the second electrode plate 2. Finally, the electrode plate is cut to adjust it to battery width and obtain a negative electrode plate for use in a battery.

[Electrolyte and Separator]

A 1 mole/liter solution of $LiPF_6$ dissolved in a 50:50 ratio by volume compound solvent of ethylene carbonate (EC) and diethyl carbonate (DEC) is used as non-aqueous electrolyte. A polypropylene micro-porous membrane is used as the separator.

[Battery Fabrication]

The first electrode plate 1 positive electrode, second electrode plate 2 negative electrode, and the separator 3 obtained in the manner described above are rolled into a spiral shape. Next, the spiral shaped unit is flattened by press-forming to make an electrode unit 10 with flat surfaces 11 on opposite sides and rounded edge regions 12 at both edges of the flat surfaces 11. This electrode unit 10 is inserted into an exterior casing 20. The exterior casing 20 is a metal case of aluminum or aluminum alloy with an inside shape only slightly larger than the outline of the electrode unit 10. The exterior casing 20, with the electrode unit 10 inserted, is closed by welding the sealing plate 21 to the open end of the exterior casing 20. Next, electrolyte is transferred into the exterior casing 20 through a liquid transfer hole provided in the sealing plate 21. Finally, the liquid transfer hole is sealed closed in an airtight fashion. A rectangular battery is fabricated by the process steps above with thickness: 10 mm, width: 34 mm, and height: 50 mm (nominal capacity: 1700 mAh).

COMPARISON EXAMPLE

As a rectangular battery comparison example, corner cuts to truncate corner regions of the outer-most first electrode plate were not provided, as shown by the broken line corner regions of FIG. 4. Other than that change, the comparison example battery was fabricated in the same manner as the lithium ion rechargeable battery.

[Method of Drop Testing]

Five rectangular batteries of each of the embodiments, the first embodiment, the second embodiment, the third embodiment, and the comparison example, were fabricated by the process steps described above. Battery voltage in the 0% charged state was measured for those batteries before and after drop testing. Drop testing released batteries in a natural fashion from a height of 1.65 m dropping them onto a concrete floor surface. Battery voltage and internal electrical resistance was measured at each drop. The criterion for abnormal voltage was a post-drop voltage reduction greater than or equal to 0.3V compared to pre-drop battery voltage. Results below show the average number of drops made for the five batteries until the abnormal voltage reduction, and the average voltage after those drops.

[Drop Test Results]

The rectangular batteries of the first embodiment developed abnormal voltage after 28.8 drops, and battery voltage decreased from 3.38V to 2.26V. The rectangular batteries of the second embodiment developed abnormal voltage after 27.2 drops, and battery voltage decreased from 3.38V to 2.36V. The rectangular batteries of the third embodiment developed abnormal voltage after 32.6 drops, and battery voltage decreased from 3.38V to 2.58V. The rectangular batteries of the comparison example developed abnormal voltage after only 13.6 drops, and battery voltage decreased from 3.38V to 0.96V.

From the drop test results, rectangular batteries of the present invention had more than twice the number of drops when battery voltage decreased greater than or equal to 0.3V. Further, the voltage reduction over those drops was very small. This makes it clear that internal short circuits from drop testing are prevented in an extremely effective manner.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2005-095583 filed in Japan on Mar. 29, 2005, the content of which is incorporated herein by reference.

What is claimed is:

1. A spiral electrode rectangular battery comprising:
   an exterior casing; and
   a first electrode plate and a second electrode plate, one of which is the positive electrode and the other is the negative electrode, the first and second electrode plates being layered with a separator in between, and rolled into an electrode unit that is housed in the exterior casing, wherein:
   the electrode unit has flat surfaces at opposite sides thereof, and edge regions that are curved with a prescribed radius of curvature as rounded edge regions that join both flat surfaces, the electrode unit being formed in a substantially flat shape;

the first electrode plate and the second electrode plate are wound to form the flat surfaces and rounded edge regions, an outer-most electrode plate is formed by the first electrode plate, and an end of the outer-most electrode plate is positioned at one of the rounded edge regions;

the outer-most electrode plate defines corner cuts where there is no corner at an outer edge of the outer-most electrode plate at the end thereof;

an insulating protective tape is provided at the rounded edge region which is opposite relative to the rounded edge region where the end of the outer-most electrode plate is located;

the second electrode plate is the negative electrode; and the insulating protective tape is positioned to cover a ridge at the end of the negative electrode and continuously extend to a region of the rounded edge region where the insulating protective tape does not face the negative electrode.

2. The spiral electrode rectangular battery as recited in claim 1, wherein at least one of the electrode plates comprises an active layer laminated on the surface of an electrode core.

3. The spiral electrode rectangular battery as recited in claim 2 wherein the electrode core is a metal foil.

4. The spiral electrode rectangular battery as recited in claim 3, wherein the electrode core is either aluminum foil or copper foil.

5. The spiral electrode rectangular battery as recited in claim 2 wherein the end of the core of the outer-most electrode plate is positioned at one of the rounded edge regions.

6. The spiral electrode rectangular battery as recited in claim 1 wherein the separator is made wider than the first electrode plate and the second electrode plate.

7. The spiral electrode rectangular battery as recited in claim 1 wherein the boundaries between the edges at the sides of the outer-most electrode plate and the corner cuts are positioned on a flat surface.

8. The spiral electrode rectangular battery as recited in claim 1 wherein the corner cuts of the electrode unit are defined by curved surfaces of the outer-most electrode plate, the curved surfaces extend over at least one of the flat surfaces.

9. The spiral electrode rectangular battery as recited in claim 1 wherein the battery is a non-aqueous electrolyte rechargeable battery.

10. The spiral electrode rectangular battery as recited in claim 9 wherein the battery is a lithium ion rechargeable battery.

11. The spiral electrode rectangular battery as recited in claim 1 wherein part of the outer-most electrode plate on one of the flat surfaces is folded over to establish a folded-back tab, and the folded-back tab is connected to the exterior casing.

12. The spiral electrode rectangular battery as recited in claim 1 wherein an insulating tape is attached so as to cover the end of the outer-most electrode plate at the rounded edge region.

13. The spiral electrode rectangular battery as recited in claim 1, wherein the corner cuts form an end portion of the outer-most electrode plate having a width that is less than a width of the remainder of the outer-most electrode plate, the width of the remainder of the outer-most electrode plate being defined by a distance between longitudinal sides of the outer-most electrode plate that are orthogonal to the end of the outer-most electrode plate, and wherein the end of the outer-most electrode plate is positioned substantially at one of the ends of the longitudinal sides of the electrode unit.

14. The spiral electrode rectangular battery as recited in claim 13, wherein a thickness of the end portion of the outermost electrode plate is substantially uniform.

15. The spiral electrode rectangular battery as recited in claim 1, wherein the corner cuts are configured to extend from one of the rounded edge regions to the other of the rounded edge regions.

16. The spiral electrode rectangular battery as recited in claim 1, wherein the insulating protective tape is formed within the rounded edge region and is attached to a surface of the first electrode plate, and the first electrode plate is a positive electrode.

17. The spiral electrode rectangular battery as recited in claim 1, wherein the end of the negative electrode is opposed to both an inside surface of the outer-most electrode plate of the first electrode plate and an outside surface of the first electrode plate that is one winding inside of the outer-most electrode plate, thereby interposing the insulating protective tape between each surface side of the negative electrode and opposing surfaces of the first electrode plate, respectively.

18. The spiral electrode rectangular battery as recited in claim 1, wherein the outer-most electrode plate is opposed to another part of the first electrode plate from one of the rounded edge regions to the other of the rounded edge regions without the second electrode plate being interposed therebetween.

* * * * *